United States Patent
Frustaci et al.

(10) Patent No.: US 7,273,674 B1
(45) Date of Patent: Sep. 25, 2007

(54) PRIMARY ELECTROCHEMICAL CELL HAVING SCALLOPED ELECTRODES

(75) Inventors: Dominick Frustaci, Williamsville, NY (US); Tina Urso, East Amherst, NY (US); Paul Hallifax, Gasport, NY (US)

(73) Assignee: Greatbatch Ltd., Clarence, NY (US)

( * ) Notice: Subject to any disclaimer, the term of this patent is extended or adjusted under 35 U.S.C. 154(b) by 695 days.

(21) Appl. No.: 10/788,823

(22) Filed: Feb. 27, 2004

Related U.S. Application Data (60) Provisional application No. 60/450,433, filed on Feb. 27, 2003.

(51) Int. Cl.
*H01M 2/26* (2006.01)
*H01M 6/14* (2006.01)

(52) U.S. Cl. .......................... 429/60; 429/94; 429/128; 429/161; 29/623.1

(58) Field of Classification Search ..................... None
See application file for complete search history.

(56) References Cited

U.S. PATENT DOCUMENTS

| | | | |
|---|---|---|---|
| 2,422,045 A | 6/1947 | Ruben | |
| 3,169,889 A | 2/1965 | Zahn | |
| 3,856,575 A | 12/1974 | Hughes | |
| 5,486,215 A | 1/1996 | Kelm et al. | |
| 5,549,717 A | 8/1996 | Takeuchi et al. | |
| 5,776,628 A | 7/1998 | Kraft et al. | |
| 6,383,680 B1 | 5/2002 | Hallifax et al. | |
| 6,635,381 B2 | 10/2003 | Spillman et al. | |

FOREIGN PATENT DOCUMENTS

EP 1154500 * 11/2001

* cited by examiner

*Primary Examiner*—Jonathan Crepeau
(74) *Attorney, Agent, or Firm*—Michael F. Scalise (57) ABSTRACT

A primary lithium electrochemical cell housed in a casing having a curved side wall intermediate opposed generally planar face walls is described. The cell comprises an anode and a cathode that each has a plurality of face portions joined together by connecting portions. The opposite polarity face portions and connecting portions are aligned with each other and then the electrodes are wound to provide an electrode assembly that fits in the casing. Regardless whether the cell is balanced as either an anode-limited or cathode-limited configuration, however, it is desirable to have the active material of one electrode face portion directly facing the electrode material of the counter electrode face portion. This means that the dimensional extent of the facing electrodes should be as close to each other in areas as possible to match the desired anode- or cathode-limited balance. The same is true for the connecting portions. The cell is of a high energy density for an implantable biomedical device.

22 Claims, 8 Drawing Sheets

PRIMARY ELECTROCHEMICAL CELL HAVING SCALLOPED ELECTRODES

CROSS REFERENCE TO RELATED APPLICATION

The present application claims priority from provisional application Ser. No. 60/450,433, filed Feb. 27, 2003.

BACKGROUND OF INVENTION

The present invention generally relates to the conversion of chemical energy to electrical energy, and more particularly, to a primary lithium electrochemical cell having scalloped-shaped electrodes and of either an anode- or cathode-limited balance.

SUMMARY OF THE INVENTION

The present invention provides a high energy density lithium primary cell of either an anode- or cathode-limited balance. The electrochemical cell includes a negative electrode comprising a negative electrode active material such as of an alkali metal, and a positive electrode comprising a positive electrode active material that intercalates with the alkali metal. The negative electrode and the positive electrode are of scalloped-shaped face portions electrochemically associated with each other and housed in an irregular-shaped casing. The electrodes are disposed such that a periphery of the positive electrode substantially matches the periphery of the negative electrode to support the anode- or cathode-limited balance. An electrolyte solution activates the negative and positive electrodes. Preferably, the anode and cathode electrodes are unitary members having an irregular shape matching that of the casing. The electrodes are then wound with a suitable separator to form an electrode assembly capable of use in an implantable biomedical device.

DETAILED DESCRIPTION OF THE PREFERRED EMBODIMENTS

The electrochemical cell of the present invention is of a primary chemistry. For this cell type, the anode comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg and Li—Si—B alloys and intermetallic compounds. The preferred metal comprises lithium. An alternate negative electrode comprises a lithium alloy, such as lithium-aluminum alloy. The greater the amounts of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. The negative electrode has an extended tab or lead of the same material as the current collector, i.e., preferably nickel, integrally formed therewith and contacted by a weld to a cell casing of conductive material in a casing-negative electrical configuration.

In the primary cell, the reaction at the positive electrode involves conversion into atomic or molecular forms of ions that migrate from the negative electrode to the positive electrode. The cathode active material comprises a carbonaceous chemistry or at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

The metal oxide or the mixed metal oxide is produced by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII of the Periodic Table of Elements, which include the noble metals and/or other oxide and sulfide compounds. A preferred cathode active material is a reaction product of at least silver and vanadium.

One preferred mixed metal oxide is a transition metal oxide having the general formula $SM_xV_2O_y$ where SM is a metal selected from Groups IB to VIIB and VIII wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$, in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials reference is made to U.S. Pat. No. 4,310,609 to Liang et al. This patent is assigned to the assignee of the present invention and incorporated herein by reference.

Copper silver vanadium oxide (CSVO) is another preferred composite transition metal oxide cathode material. For a more detailed description of this cathode active material reference is made to U.S. Pat. Nos. 5,472,810 and 5,516,340, both to Takeuchi et al. These patents are assigned to the assignee of the present invention and incorporated herein by reference.

In addition to the previously described silver vanadium oxide and copper silver vanadium oxide, fluorinated carbon, $Ag_2O$, $Ag_2O_2$, $CuF_2$, $Ag_2CrO_4$, $MnO_2$, $V_2O_5$, $MnO_2$, $TiS_2$, $Cu_2S$, FeS, $FeS_2$, copper oxide, copper vanadium oxide, and mixtures thereof are contemplated as useful active materials.

The above described cathode active materials are formed into an electrode body for incorporation into an electrochemical cell by mixing one or more of them with a binder material. Suitable binders are powdered fluoropolymers; more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material.

According to the present invention, any one of the above cathode active materials is mixed with a binder and a conductive diluent, if desired, and then fabricated into a structure such as a sheet, plate and the like. Structures are then individually pressed on opposite sides of a current collector so that both are in direct contact with the substrate. Suitable current collectors are selected from the group consisting of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred current collector material is titanium that may have a thin layer of graphite/carbon material applied thereto.

In order to prevent internal short circuit conditions, the cathode is separated from the Group IA, IIA and IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers inducing polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and membranes commercially available under the designations DEXIGLAS (C. H. Dexter, Div., Dexter Corp.) and TONEN.

The present invention further includes a nonaqueous, ionically conductive electrolyte that serves as a medium for migration of ions between the anode and the cathode electrodes during electrochemical reactions of the cell. The electrochemical reaction at the electrodes involves conversion of ions in atomic or molecular forms that migrate from the anode to the cathode. A suitable electrolyte has an inorganic, ionically conductive salt dissolved in a nonaqueous solvent, and more preferably, an ionizable alkali metal salt dissolved in a mixture of aprotic organic solvents comprising a low viscosity solvent and a high permittivity solvent. The inorganic, ionically conductive salt serves as the vehicle for migration of the anode ions to intercalate or react with the cathode active material. In the case of an anode comprising lithium, a lithium-bases salt is preferred. Known lithium salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6H_5)_4$ and $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl caronbate (DEC), dipropyl carbonate, and mixtures thereof. Suitable high permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode for a primary cell is lithium metal and the preferred electrolyte is 0.8 M to 1.5 M $LiAsF_6$ or $LiPF_6$ dissolved in a 50:50 mixture, by volume, of propylene carbonate and 1,2-dimethoxyethane.

As previously described, the present cells are particularly useful for powering implantable medical devices such as cardiac defibrillators, cardiac pacemakers, nerve stimulators, drug pumps, and the like. Typically electrode assemblies include those having wound design housed in a casing having a curved intermediate wall between generally planar sidewalls. As overall cell size is a prime concern in implantable medical devices, such a curved shape helps optimize volumetric efficiency and many casing configurations are contemplated as coming under the purview of this general structure.

Another important aspect of any cell powering an implantable medical device is accurate end-of-life (EOL) detection. It is imperative that the physician be able to accurately determine when the cell is nearing its intended end of discharge capability so that a replacement surgery can be scheduled and timely performed. Accurate EOL determination is impacted by whether the electrode assembly is configured to have either a cathode-limited or an anode-limited balance. For example, in a cathode-limited Li/SVO battery such as is used in many cardiac defibrillator applications, the capacity ($Q_+$) of the cathode must not exceed the capacity ($Q_-$) of the anode. This means that the capacity of the cathode active material is such that the cathode is fully intercalated with anode active material, i.e. lithium, before the anode active material is fully consumed ($Q_+<Q_-$). On the other hand, in an anode-limited cell balance, the anode active material is entirely consumed before the cathode active material is fully intercalated therewith ($Q_+>Q_-$). The present electrode assembly is uniquely suited to accommodate either type of electrode capacity balance in a casing having a volumetrically efficient shape.

Figure 1:
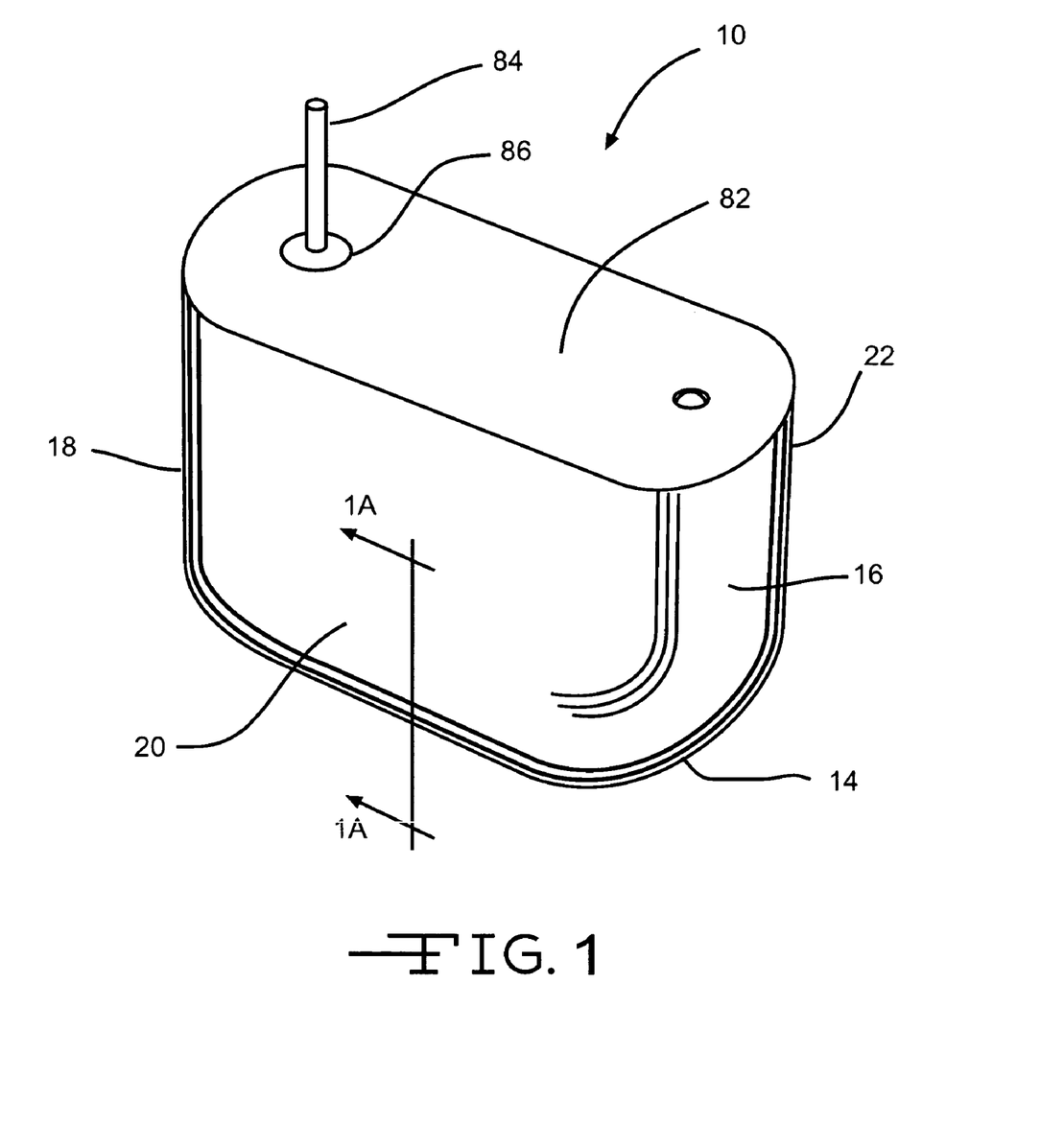
FIG. 1 is a perspective view of cell casing 10 according to one embodiment of the present invention.
Figure 1A:
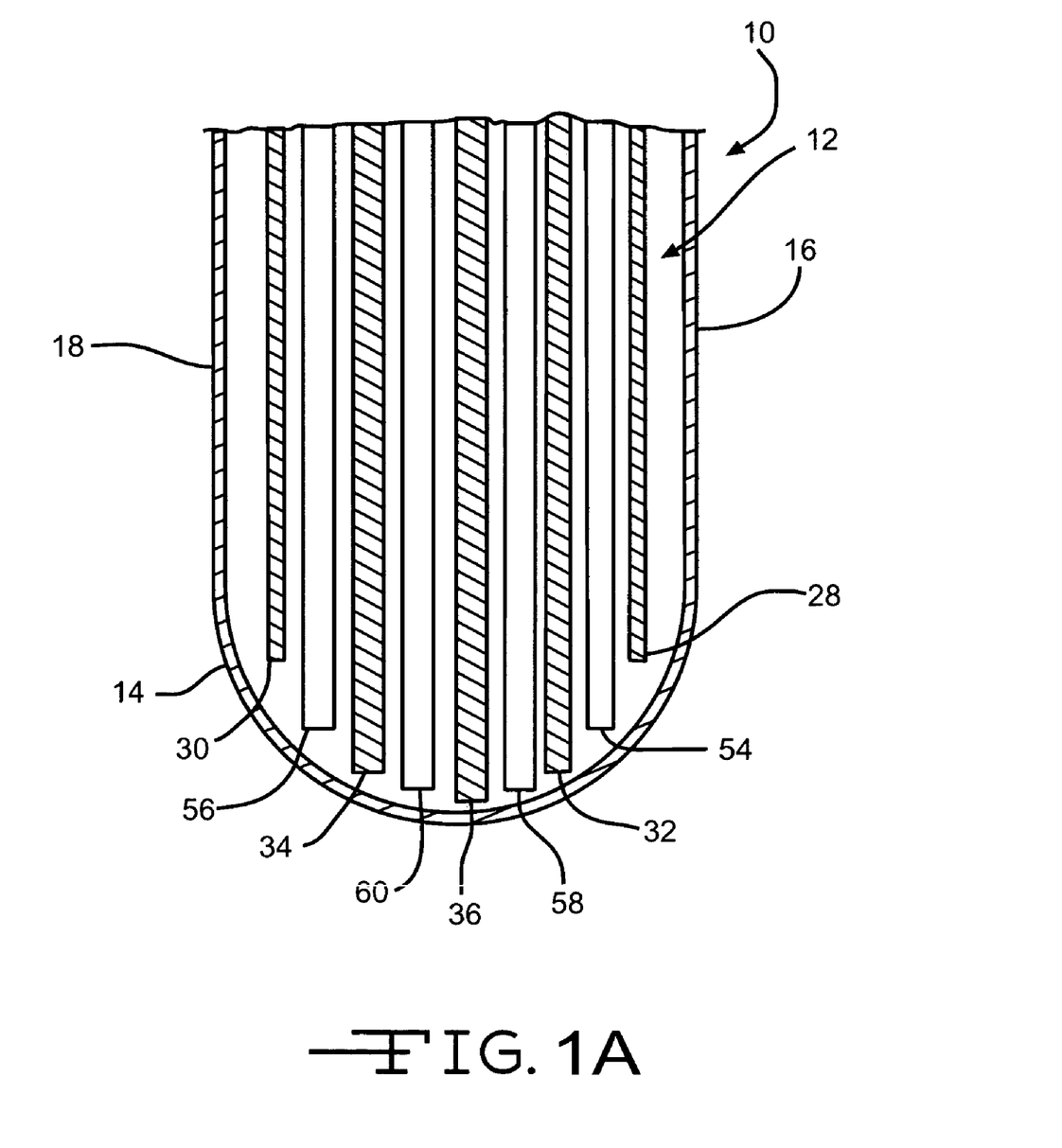
FIG. 1A is a cross-sectional view along lines 1A-1A of FIG. 1.
Figure 2:
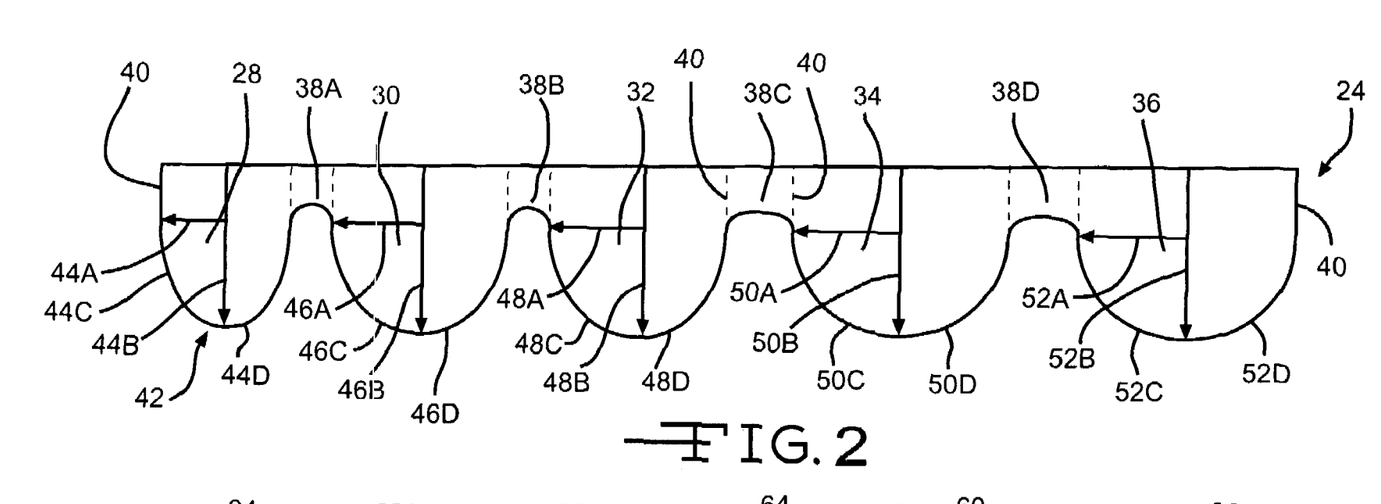
FIG. 2 is a plan view of an anode electrode 24 according to the present invention.
Figure 3:
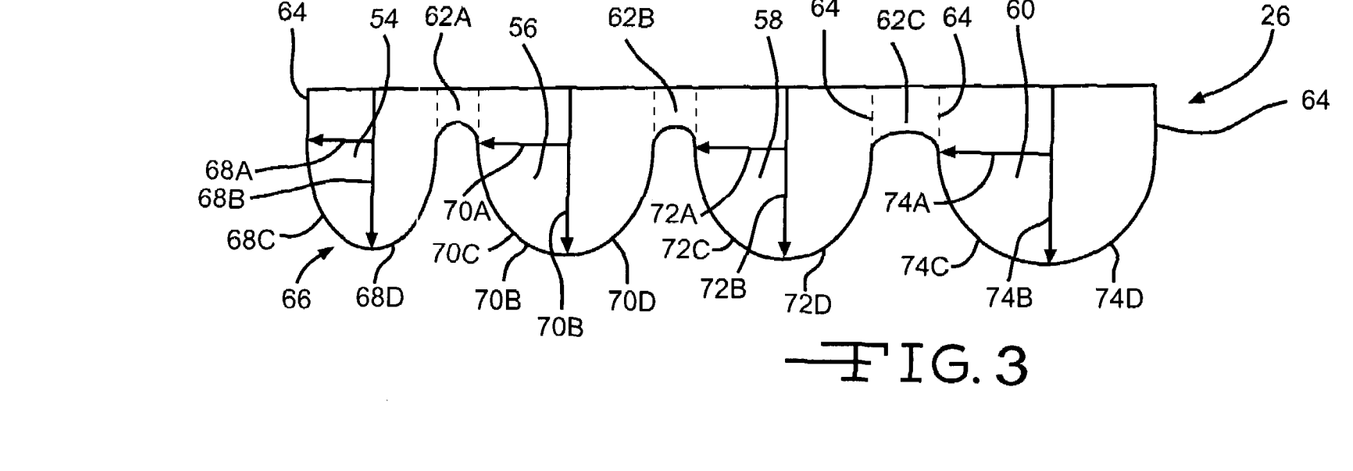
FIG. 3 is a plan view of a cathode electrode 26 according to the present invention.
Figure 4:
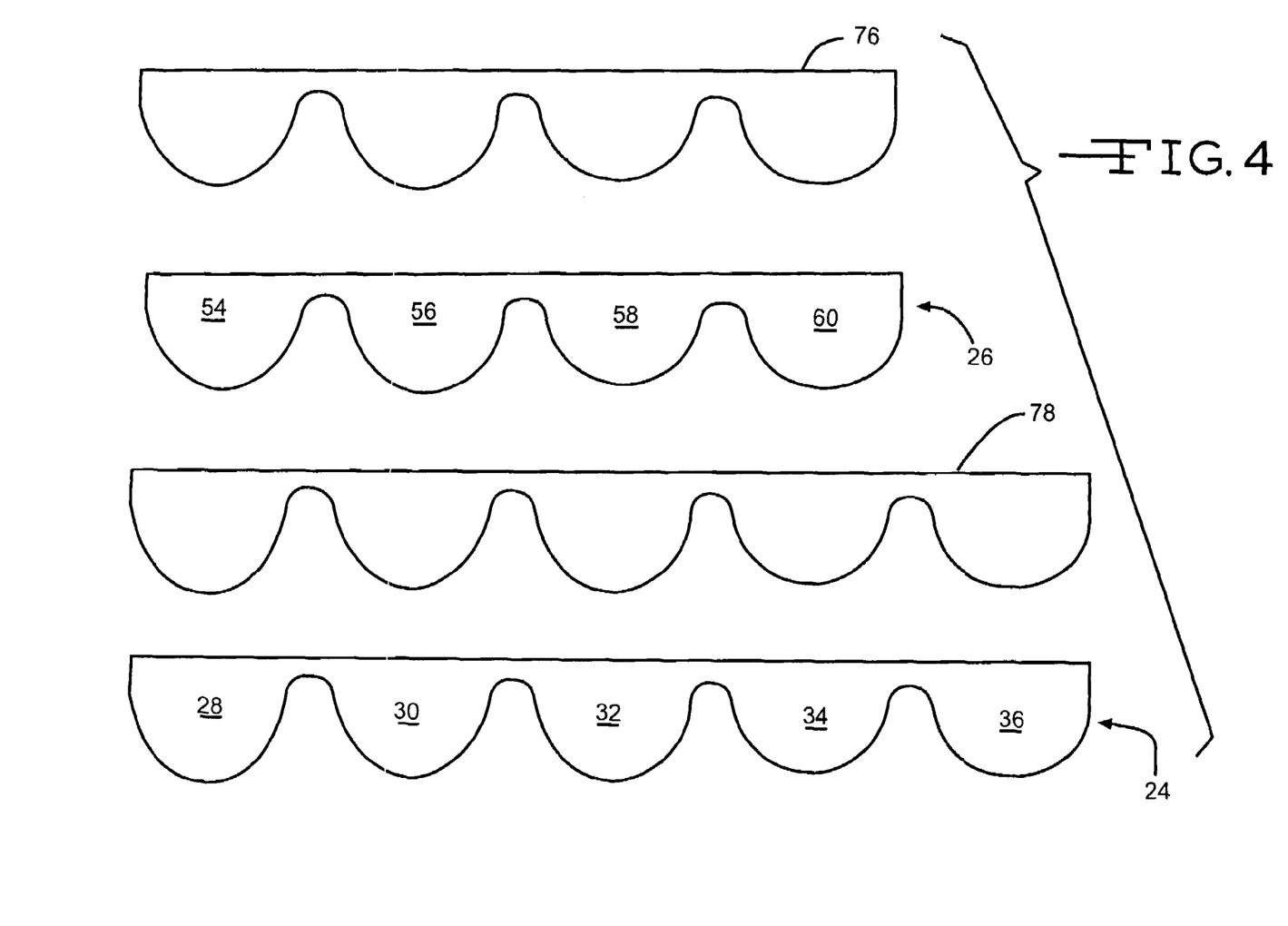
FIG. 4 is an exploded view of the anode and cathode electrodes of FIGS. 2 and 3 along with intermediate separators 76 and 78.
Figure 5:
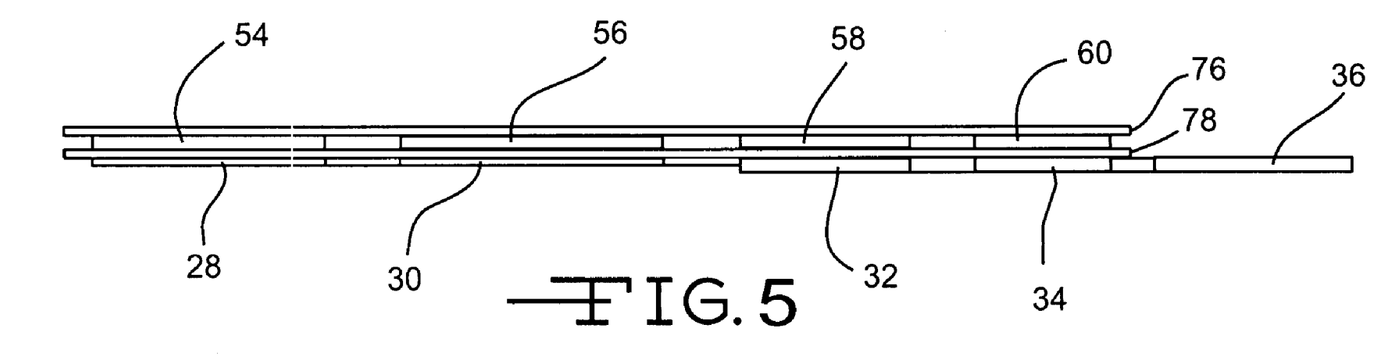
FIG. 5 is a bottom elevational view of the anode and cathode electrodes prior to being wound into an electrode assembly.

Referring now to the drawings, FIGS. 1 and 1A show a casing 10 for housing a first embodiment of an electrode assembly 12 according to the present invention. The casing 10 comprises a curved bottom wall 14 extending to planar end walls 16 and 18 and planar face walls 20 and 22. The electrode assembly 12 comprises a unitary anode or negative electrode 24 (FIG. 2) and a unitary cathode or positive electrode 26 (FIG. 3).

The anode 24 is shown comprising five face portions designated as 28, 30, 32, 34 and 36. It should be understood, however, that while five anode face portions are shown, that is not limiting. The anode can have more or less than that number of face portions. The face portions are scalloped with each having a semi-circular or semi-elliptical edge connected by a first continuous metallic element comprising connecting portions 38A, 38B, 38C and 38D. As will be apparent hereinafter, in the final electrode assembly, the anode face portions will be generally parallel to the casing face walls 20, 22 while the connecting portions will contour to the shape of the curved casing end walls 16, 18 connecting between the face walls.

A separate metallic element that is not shown may extend from any part of the anode to a terminal of the battery in order to establish electrical continuity, or any part of the anode may be welded directly to a battery terminal. The sections 38A, 38B, 38C, and 38D that connect the various anode face portions together are preferably coated with electrochemically active materials.

The lengths of the various anode connecting portions 38A, 38B, 38C and 38D depend on the particular design of the battery, but the length of any metallic connecting portion is greater than that of the portion immediately preceding it, when viewed in FIG. 2 from left to right. In that respect, connecting portion 38A is shorter than connecting portion 38B, connecting portion 38B is shorter than connecting portion 38C and connecting portion 38C is shorter than connecting portion 38D.

Each anode face portion 28, 30, 32, 34 and 36 has characteristic dimensions that may vary depending on the battery design and the method of assembly. In the present example, each anode face portion has a straight side 40 and an integral semi-elliptical or semi-circular shape 42. The radii of the semi-elliptical or semi-circular shapes are indicated as 44A, 44B, 46A, 46B, 48A, 48B, 50A, 50B, 52A and 52B. The relationships among these radii depend on the geometry and method of battery construction. However, in the drawing figure the radii 44A, 46A, 48A, 50A and 52A become gradually greater as the electrode extends from face portion 44A to 52A. Similarly, the radii 44B, 46B, 48B, 50B and 52B become gradually greater as the electrode extends from face portion 44A to 52A.

Also, shown are curved surfaces 44C, 44D, 46C, 46D, 48C, 48D, 50C, 50D, 52C, and 52D, which define the outer boundaries of the various anode face portions. Again, the relationships between the geometry of these curved surfaces and the straight side 40 and their dimensions depend on the geometry and the method of battery construction. In the drawing figure, the curved surface pairs "C" and "D" for each anode portion 44, 46, 48, 50 and 52 are generally equal, although this is not necessary.

In FIG. 3, the cathode assembly 26 is shown comprising four face portions designated as 54, 56, 58 and 60 connected by a second continuous metallic element having connecting portions 62A, 62B and 62C. There may be more than four cathode face portions depending on the particular aspects of the design. As described before with respect to the anode, the cathode face portions will reside generally parallel to the casing face walls 20, 22 while the connecting portions will contour to the shape of the curved casing end walls 16, 18 in the final electrode assembly.

In a cell having a casing-negative design, there is preferably at least one more anode face portion than cathode face portion. This helps in directly connecting anode face portions 28 and 30, which will reside on the outermost sides of the electrode assembly, to the casing. For a case-positive design, the opposite is true with their being one more cathode face portion than anode face portions with the cathode directly connected to the casing. Also, anode face portions 28 and 30 only have lithium on the one side of the current collector that will be opposite the casing sidewall.

A separate metallic element (not shown) may extend from any part of the cathode assembly 26 to a battery terminal in order to establish electrical continuity, or any part of the cathode may be welded directly to a battery terminal. The metallic portions that connect the various cathode face portions are preferably coated with electrochemically active materials. For example, some of the connecting portions may be coated while one or more may be uncoated.

The lengths of the various cathode-connecting portions depend on the particular design of the battery, but the length of any connecting portion is greater than that of the portion immediately preceding it as viewed from left to right in FIG. 3. In that regard, connecting portion 62A is shorter than connecting portion 62B and connecting portion 62B is shorter than connecting portion 62C.

Each cathode face portion 54, 56, 58 and 60 has characteristic dimensions that vary depending on the battery design and the method of assembly. In the present example, each cathode face portion has a straight side 64 and an attached semi-elliptical or semi-circular shape 66. The radii of the semi-elliptical or semi-circular shapes of the cathode face portions are indicated as 68A, 68B, 70A, 70B, 72A, 72B, 74A and 74B. The relationships among these radii depend on the geometry and method of battery construction. However, in the drawing figure the radii 68A, 70A, 72A and 74A become gradually greater as the electrode extends from face portion 68A to 74A. Similarly, the radii 68A, 70B, 72B and 74B become gradually greater as the electrode extends from face portion 68A to 74A.

Also, shown are curved surfaces 68C, 68D, 70C, 70D, 72C, 72D, 74C and 74D, which define the outer boundaries of the various cathode face portions. Again, the relationships between the geometry of these curved surfaces and the straight side 64 and their dimensions depend on the geometry and the method of battery construction. In the drawing figure, the curved surface pairs "C" and "D" for each anode portion 68, 70, 72 and 74 are generally equal, although this is not necessary.

Turning to FIGS. 4 to 7, a first embodiment of the electrode assembly 12 of the present invention is assembled by placing two sheets of separator 76 and 78 on opposite sides of the cathode electrode 26. The separators are positioned between the anode 24 and the cathode 26, and completely cover the electrodes to prevent direct contact between them. The separators may consist of individual pieces cut to a specific profile and shape to cover the electrodes, or they may be heat sealed directly around the anode, the cathode, or both. Next, starting at one end and winding toward the opposite end, as indicated by arrows 80 in FIG. 6, winds the combined anode and cathode electrode strips and separator.

Referring back to FIGS. 1 and 1A, the thusly wound electrode assembly 11 is suitable for housing in the casing 10 having the curved bottom wall 14 extending to the planar end walls 16 and 18 and planar face walls 20 and 22. As the curved bottom 14 extends toward the face walls 20 and 22, the amount of space at the bottom of the casing decreases.

Accordingly, the smaller positive and negative face portions are disposed closer toward the casing face walls 20, 22. As a result, the electrode assembly maintains the relationship between each positive electrode face portion and its two adjacent negative electrode face portions and also maximizes the volumetric efficiency of the casing. This means that more active material is housed in a given casing volume because the scalloped-shaped electrode face portions extend to proximate the casing bottom.

Then, after the electrode assembly 12 is inserted into the casing 10, the anode lead (not shown) is welded to the interior of the casing at one or more of a number of locations. Depending on the cell design, the anode lead may be welded to the inside of the casing or to the underside of the lid 82 or header. Additionally, the anode lead may be pinched between the lid 82 and the casing and subsequently fused as the lid and casing are hermetically welded together. Methods of welding the anode lead to the casing, to the lid or to both include resistance welding, plasma welding, ultrasonic welding and laser welding. Regardless of where the anode lead is welded to the casing, the header assembly is hermetically welded to the casing. This case-negative cell design has the cathode connected to a terminal pin 84 insulated from the casing and lid by a glass-to-metal seal 86.

For a case-positive cell design, the anode 12 is connected to the casing 10 as its terminal while the cathode 26 is connected to a terminal pin 84 electrically insulated from the lid 82 by the glass-to-metal seal 86.

Figure 6:
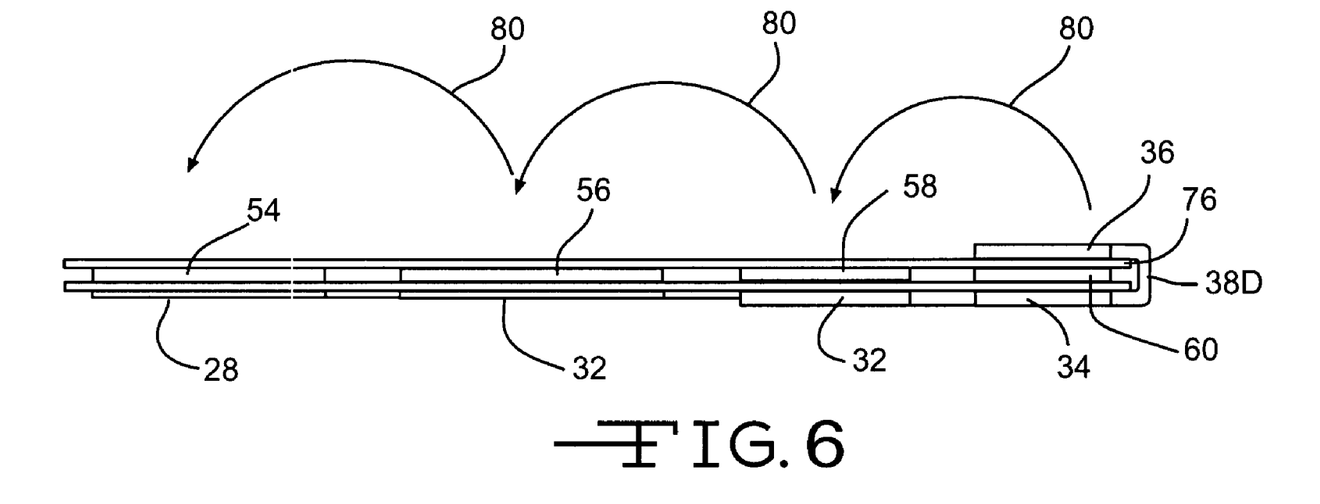
FIG. 6 is a bottom elevational view of the anode and cathode electrodes of FIG. 5 being wound into an electrode assembly.
Figure 7:
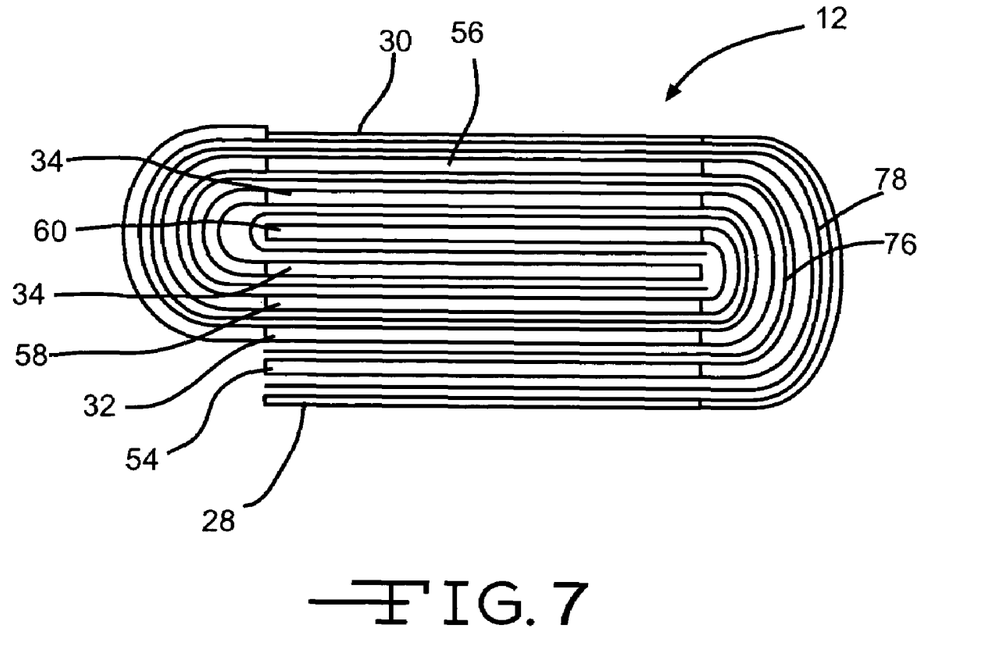
FIG. 7 is a top plan view of the electrode assembly 12 that results from winding the electrodes of FIG. 6.

It is also contemplated by the scope of the present invention that the anode electrode 24 and the cathode electrode 26 can have the same number of portions, for example four. This would mean the elimination of anode portion 28 or 36. Otherwise, the electrode assembly is formed in the same manner with the overlaying electrodes and intermediate separator being wound as shown in FIG. 6.

An alternate method of assembling the cell involves winding the anode and cathode electrodes on a mandrel, removing the mandrel from the wind and inserting the wound electrode assembly into a cell casing or container. In such a design, an elongated terminal pin is not required. Instead, a cathode lead is welded to the cathode current collector by one of numerous methods such as resistance welding, plasma welding, ultrasonic welding or laser welding. The cathode lead is then welded directly to the terminal pin. The cathode lead may be rounded, flattened, chemically etched or mechanically roughened in order to facilitate welding.

As previously described, the present electrode assembly 12 housed in the casing 10 is particularly well suited for primary cells of either an anode limited ($Q_-<Q_+$) or a cathode limited ($Q_+>Q_-$) balance. In such designs, it is desirable to have the boundaries of the individual electrode face portions matching those of the opposite polarity that they are sandwiched between. While the electrodes assembly 12 in FIG. 1A is enlarged for the sake of illustration, it is within the scope of the present invention that the capacity of any one electrode face portion is sized to match that of the adjacent opposite polarity face portions for the purpose of maintaining the desired anode-limited or cathode-limited balance.

For example, in a cathode-limited balance, the capacity of anode face portion 30 and one-half of that of anode face portion 34 is greater than that of intermediate cathode face portion 56. Only one-half of anode face portion 34 is balanced to cathode face portion 56 because the other half is balanced to cathode face portion 60. The capacity of the opposite half of anode face portion 34 and one-half of anode face portion 36 is greater than the capacity of cathode face portion 60. The capacity of the opposite half of anode face portion 36 and one-half of anode face portion 32 is greater than the capacity of cathode face portion 58. Finally, the capacity of the opposite half of anode face portion 32 and all of anode face portion 28 is greater than that of intermediate cathode face portion 54. As will now be apparent to those skilled in the art, a similar capacity relationship exists for the various immediately adjacent opposite polarity connecting portions.

As previously discussed, it is also with the scope of the present invention that a wound electrode assembly for a casing having radiused sidewalls can have a case-positive design. This cell design is shown with respect to FIGS. 8 to 10. These drawings illustrate a "galaxy wound" electrode assembly 100 comprising an anode electrode 102 and a cathode electrode 120. The anode electrode comprises five face portions designated 104, 106, 108, 110 and 112 joined by connecting portions 114A, 114B, 114C and 114D. The cathode electrode 120 is in two pieces or sections. The first comprises face portions 122, 124 and 126 joined by connecting portions 128A and 128B. The second cathode section comprises face portions 130, 132 and 134 joined by connecting portions 136A and 136B.

Figure 8:
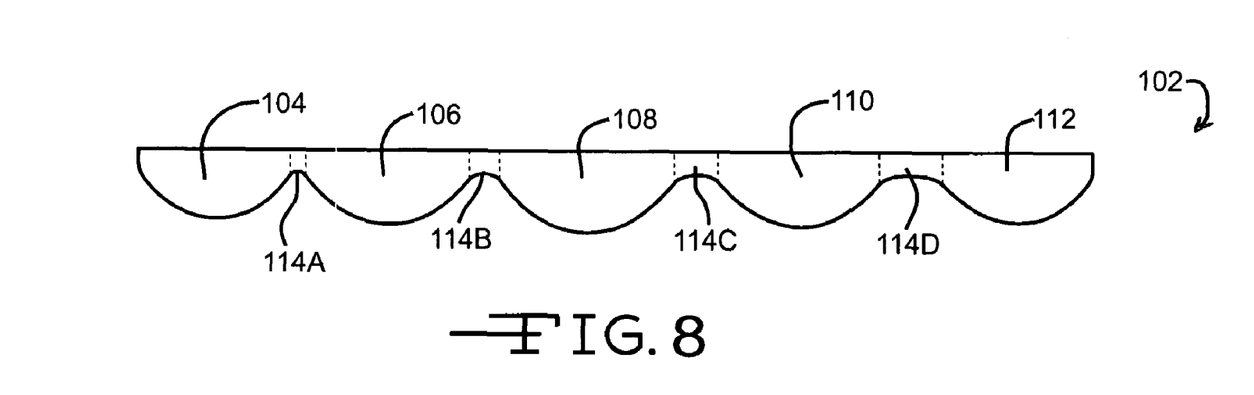
FIG. 8 is a plan view of an anode electrode 102 according to another embodiment of the present invention.
Figure 9:
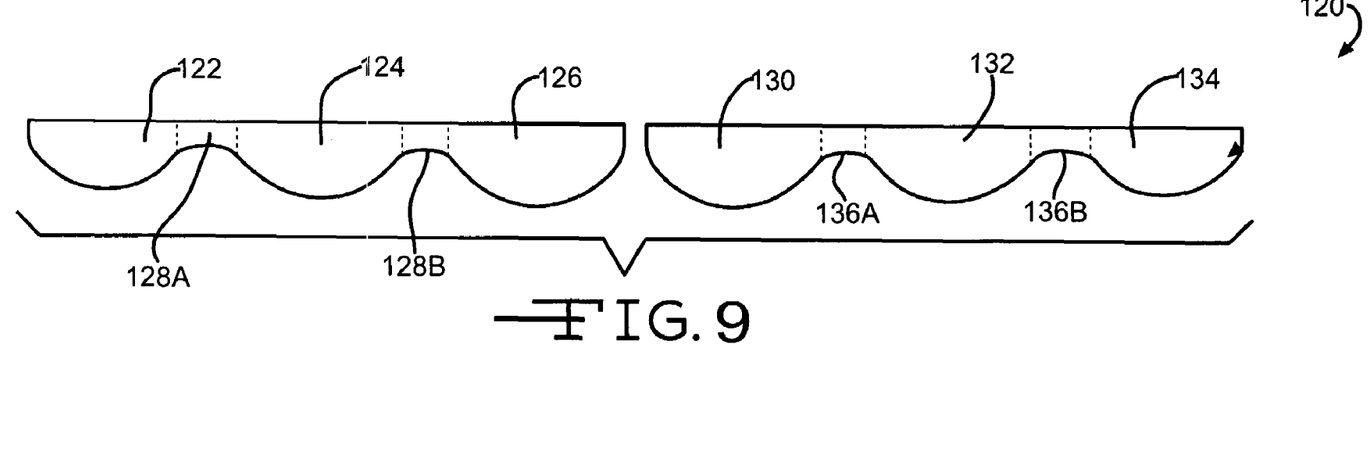
FIG. 9 is a plan view of a cathode electrode 120 for use with the anode electrode of FIG. 8.
Figure 10:
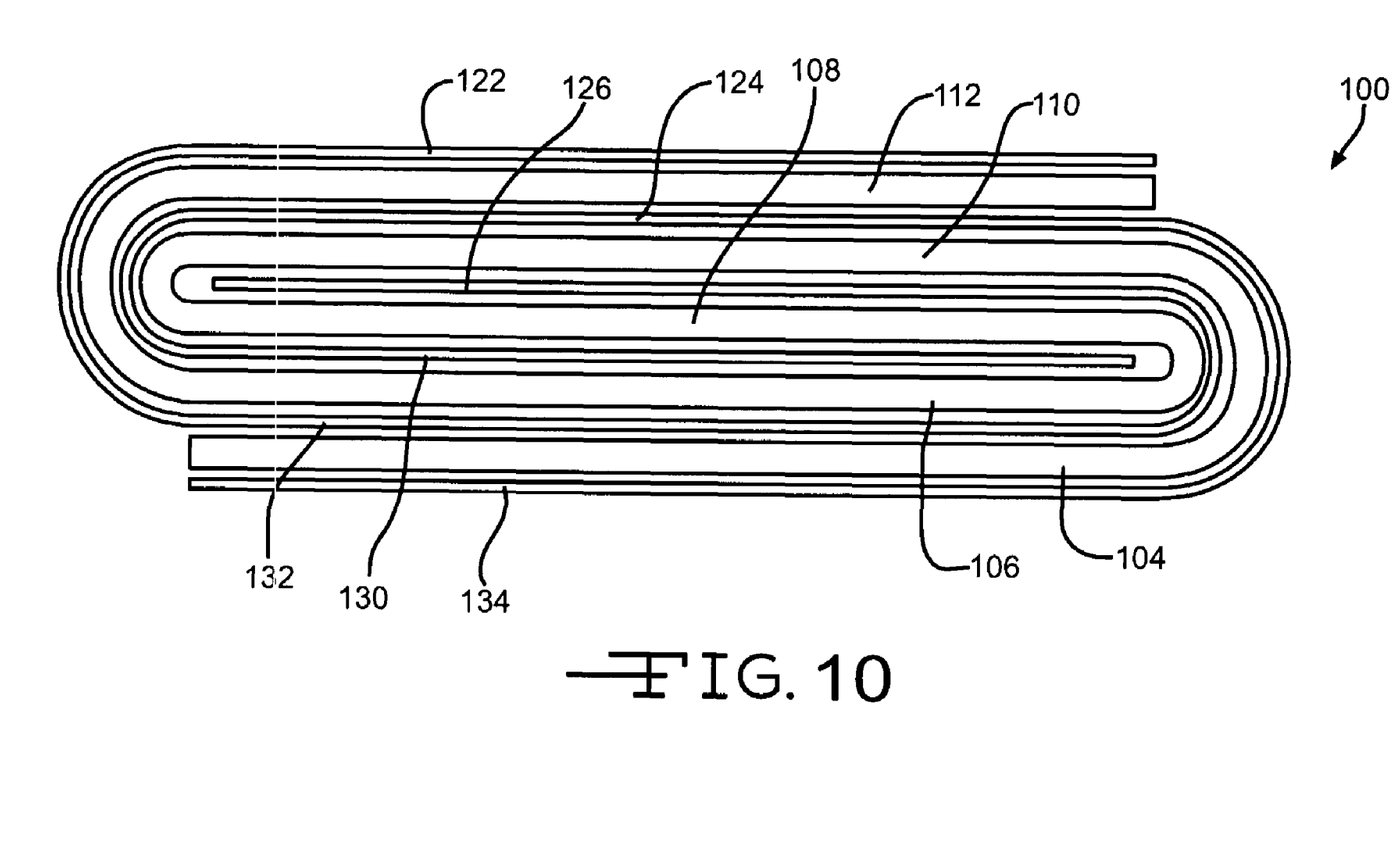
FIG. 10 is a top plan view of the electrode assembly 100 that results from winding the electrodes of FIGS. 8 and 9.

To form the electrode assembly 120, the first cathode section is aligned with the anode electrode 102 such that cathode face portions 122, 124 and 126 align with anode face portions 104, 106 and 108, respectively. The second cathode section is aligned with the anode electrode 102 with the cathode face portions 130, 132 and 134 aligned with the anode face portions 108, 110 and 122, respectively, but on the opposite side of the anode electrode as the first cathode section. The thusly-aligned anode and cathode electrodes are then wound to provide the electrode assembly 100 shown in FIG. 10. As with the previously described electrode assembly 12, the curved anode and cathode face portions are generally parallel to the casing face walls 20 and 22 while the connecting portions contour to the shape of the curved of radiused end walls 14, 16 and 18. Also, the same relationship with respect to the capacity of the various face portions holds as with the electrode assembly 12 depending on whether the cell is of an anode- or cathode-limited design.

The metallic casing may comprise materials such as stainless steel, mild steel, nickel-plated mild steel, titanium, tantalum or aluminum, but not limited thereto, so long as the metallic material is compatible for use with components of the cell. The cell header or lid comprises a metallic disc-shaped body with a first hole to accommodate the glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the casing. The positive terminal pin supported in the glass-to-metal seal is, in turn, supported by the header, which is welded to the casing containing the electrode assembly. The cell is thereafter filled with the electrolyte solution described hereinabove and hermetically sealed such as by close-welding a stainless steel ball over the fill hole, but not limited thereto.

Accordingly, the present invention provides a primary battery having an irregular shape with a unitary anode and unitary cathode that are wound to provide a high energy density for an implantable biomedical device. This is accomplished while tailoring the electrode assembly to be either anode- or cathode-limited in the irregularly shaped casing.

It is appreciated that various modifications to the present inventive concepts described herein may be apparent to those of ordinary skill in the art without departing from the spirit and scope of the present invention as defined by the herein appended claims.

What is claimed is:

1. An electrochemical cell, which comprises:
   a) a casing comprising a curved wall extending to an opening closed by a lid;
   b) an anode comprising a plurality of anode portions joined by anode connecting portions, wherein the anode portions comprise an anode current collector supporting lithium;
   c) a cathode comprising a plurality of cathode portions joined by cathode connecting portions, wherein the cathode portions comprise a cathode current collector supporting a cathode active material which intercalates with lithium;
   d) a separator disposed between the anode and the cathode as an electrode assembly housed in the casing with a periphery of the anode and cathode portions substantially following a contour of the curved wall of the casing;
   e) an electrolyte activating the electrode assembly;
   f) wherein the cell has either:
      i) a first cathode portion disposed intermediate first and second anode portions and wherein a combined capacity of a first and second anode faces of the respective first and second anode portions facing opposite sides of the first cathode portion is greater than a capacity of the first cathode portion, or
      ii) a first anode portion disposed intermediate first and second cathode portions and wherein a combined capacity of a first and second cathode faces of the respective first and second cathode portions facing opposite sides of the first anode portion is greater than a capacity of the first anode portion.

2. The electrochemical cell of claim 1 wherein the anode and cathode are unitary members.

3. The electrochemical cell of claim 1 wherein one of the anode and the cathode electrodes is provided in two sections and the other electrode is a unitary member and a first one of the sections is aligned with a first side of the other electrode and a second one of the sections is aligned with a second side of the other electrode.

4. The electrochemical cell of claim 1 wherein the anode and cathode portions have at least one side formed in the shape of a curved surface.

5. The electrochemical cell of claim 1 wherein the anode and cathode portions decrease in size from those disposed in a middle position of the electrode assembly to an outer position thereof.

6. The electrochemical cell of claim 1 wherein the anode and cathode connecting portions increase in length from a first end of the respective anode and cathode to an opposite end thereof.

7. The electrochemical cell of claim 1 wherein the anode and the cathode are wound to form the electrode assembly.

8. The electrochemical cell of claim 1 wherein if the cell is in a case-negative design, there is one more anode portion than cathode portions or if the cell is in a case-positive design, there is one more cathode portion than anode portions.

9. The electrochemical cell of claim 1 wherein there is an equal number of cathode face portions and anode face portions and the cell is in either a case-positive or a case-negative design.

10. The electrochemical cell of claim 1 wherein casing comprises opposed generally planar face walls extending to the curved wall intermediate the face walls.

11. An electrochemical cell, which comprises:
    a) a casing comprising opposed generally planar face walls extending to a curved wall intermediate the face walls and extending to an opening closed by a lid;
    b) an anode comprising a plurality of anode portions joined by anode connecting portions, wherein the anode portions comprise an anode current collector supporting lithium;
    c) a cathode comprising a plurality of cathode portions joined by cathode connecting portions, wherein the cathode portions comprise a cathode current collector supporting a cathode active material which intercalates with lithium;
    d) a separator disposed between the anode and the cathode as an electrode assembly housed in the casing with the anode and cathode portions aligned generally parallel to the opposed casing face walls while a periphery of the anode and cathode portions substantially following a contour of the curved wall of the casing;
    e) an electrolyte activating the electrode assembly;
    f) wherein the cell is either in:
       i) a case-negative design with a first cathode portion disposed intermediate first and second anode portions and wherein a combined capacity of a first and second anode faces of the respective first and second anode portions facing opposite sides of the first cathode portion is greater than a capacity of the first cathode portion, or
       ii) a case-positive design with a first anode portion disposed intermediate first and second cathode portions and wherein a combined capacity of a first and second cathode faces of the respective first and second cathode portions facing opposite sides of the first anode portion is greater than a capacity of the first anode portion.

12. The electrochemical cell of claim 11 wherein the largest negative and positive portions are disposed in the center of the electrode assembly and the other negative and positive portions disposed on opposite sides of the largest negative and positive portions become gradually smaller as the distance from the largest negative and positive portions increases.

13. A method for providing an electrochemical cell, comprising the steps of:
    a) providing a casing comprising opposed generally planar face walls extending to a curved wall intermediate the face walls;
    b) providing an anode comprising a plurality of anode portions joined by anode connecting portions, wherein the anode portions comprise an anode current collector supporting lithium;
    c) providing a cathode comprising a plurality of cathode portions joined by cathode connecting portions, wherein the cathode portions comprise a cathode current collector supporting a cathode active material which is intercalatable with lithium;
    d) placing the anode and the cathode adjacent to one another such that the anode portions and the anode connecting portions are aligned with the cathode portions and the cathode connecting portions;

e) providing a separator disposed between the anode and the cathode;

f) winding a first set of the anode and cathode portions on top of a second set of the anode and cathode portions to provide an electrode assembly;

g) housing the electrode assembly in the casing such that a periphery of the anode and cathode portions substantially follows a contour of the curved wall of the casing;

h) including providing the cell having either:
  i) a first cathode portion disposed intermediate first and second anode portions and wherein a combined capacity of a first and second anode faces of the respective first and second anode portions facing opposite sides of the first cathode portion is greater than a capacity of the first cathode portion, or
  ii) a first anode portion disposed intermediate first and second cathode portions and wherein a combined capacity of a first and second cathode faces of the respective first and second cathode portions facing opposite sides of the first anode portion is greater than a capacity of the first anode portion; and g) closing the open end of the casing with a lid and activating the electrode assembly with an electrolyte.

14. The method of claim 13 wherein the anode and cathode are unitary members.

15. The method of claim 13 wherein one of the anode and the cathode electrodes is provided in two sections and the other electrode is a unitary member and a first one of the sections is aligned with a first side of the other electrode and a second one of the sections is aligned with a second side of the other electrode before the electrodes are wound to provide the electrode assembly.

16. The method of claim 13 including providing one more anode portion than cathode portion and providing the electrode assembly begins by winding the one anode portion on top of a cathode portion.

17. The method of claim 13 including providing an equal number of cathode face portions and anode face portions and the cell is in either a case-positive or a case-negative design.

18. The method of claim 13 including incrasing the anode and cathode connecting portions in length from a first end of the respective electrode assembly to an opposite end thereof.

19. The cell of claim 1 wherein the cell is in a case-negative design having the first cathode portion disposed intermediate the first and second anode portions.

20. The cell of claim 1 wherein the cell is in a case-positive design having the first anode portion disposed intermediate the first and second cathode portions.

21. The method of claim 13 including providing the cell in a case-negative design by positioning the first cathode portion intermediate the first and second anode portions.

22. The method of claim 13 including providing the cell in a case-positive design by positioning the first anode portion intermediate the first and second cathode portions.

* * * * *

UNITED STATES PATENT AND TRADEMARK OFFICE
CERTIFICATE OF CORRECTION

PATENT NO. : 7,273,674 B1
APPLICATION NO. : 10/788823
DATED : September 25, 2007
INVENTOR(S) : Frustaci et al.

It is certified that error appears in the above-identified patent and that said Letters Patent is hereby corrected as shown below:

Column 4, line 8, delete "lithium-bases" and insert --lithium-based--.

Column 6, line 67, delete "68A, 70B, 72B" and insert --68B, 70B, 72B--.

Column 7, line 51, delete "(Q+ >Q_)" and insert --(Q+ < Q_)--.

Signed and Sealed this

Sixth Day of May, 2008

JON W. DUDAS
*Director of the United States Patent and Trademark Office*